May 8, 1934.  G. A. HEUS ET AL  1,958,086
POWER TAKE-OFF FOR MOTOR VEHICLES
Filed March 16, 1932  3 Sheets—Sheet 2
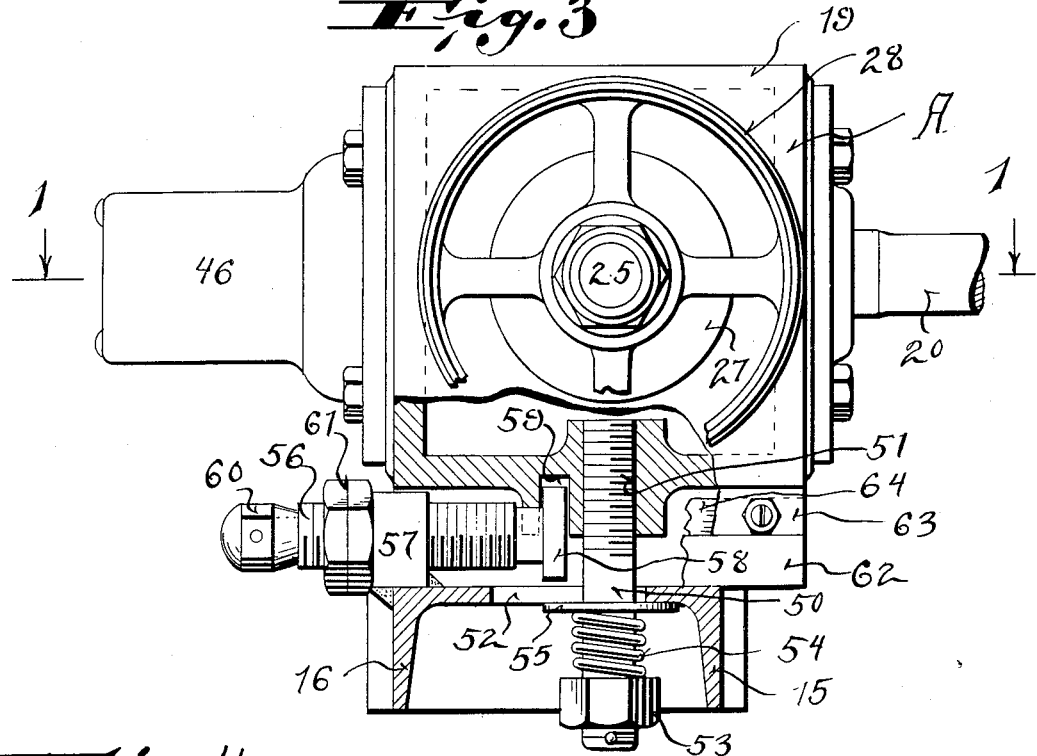
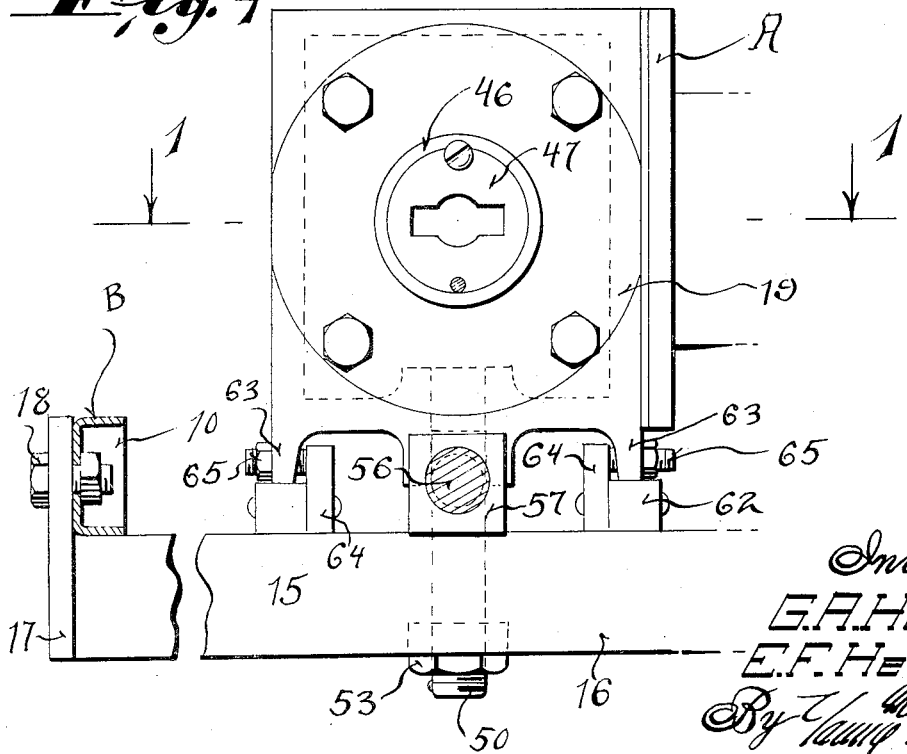
Inventors
G. A. Heus
E. F. Heus
By
Attorneys May 8, 1934.     G. A. HEUS ET AL     1,958,086
POWER TAKE-OFF FOR MOTOR VEHICLES
Filed March 16, 1932     3 Sheets-Sheet 3
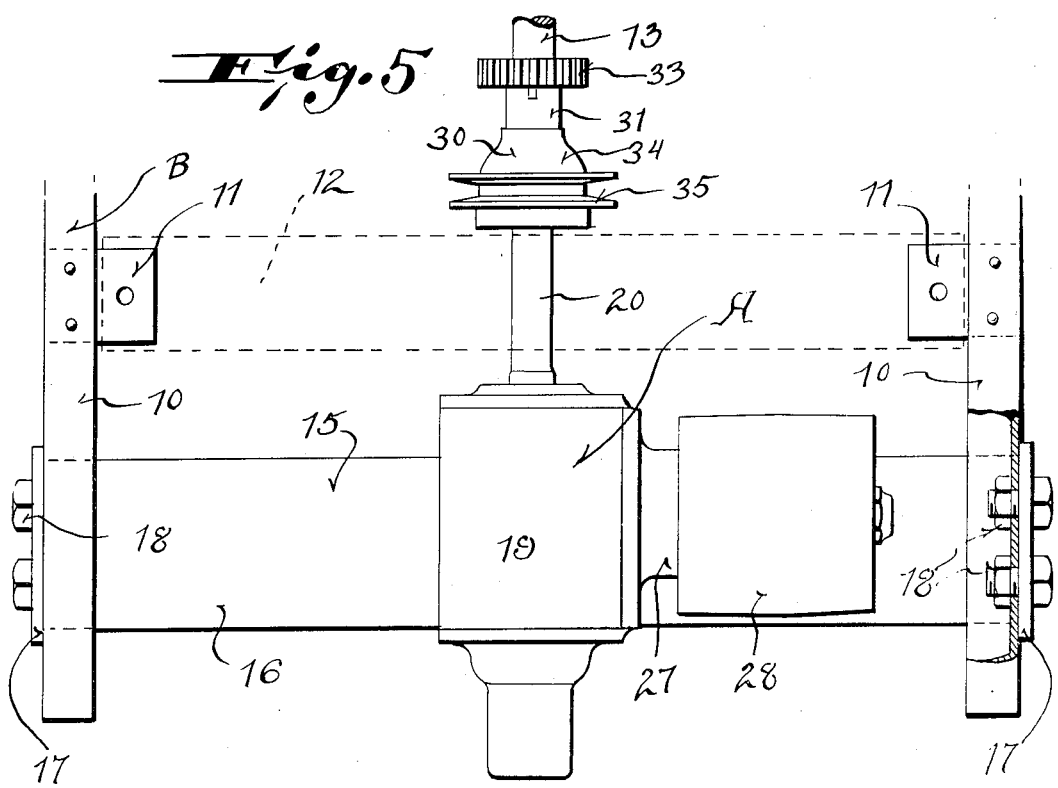
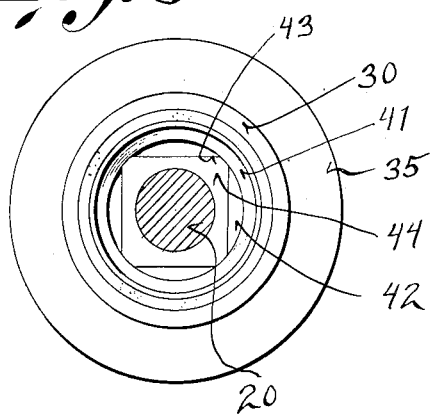
Inventors
G. A. Heus
E. F. Heus
By
Attorneys Patented May 8, 1934

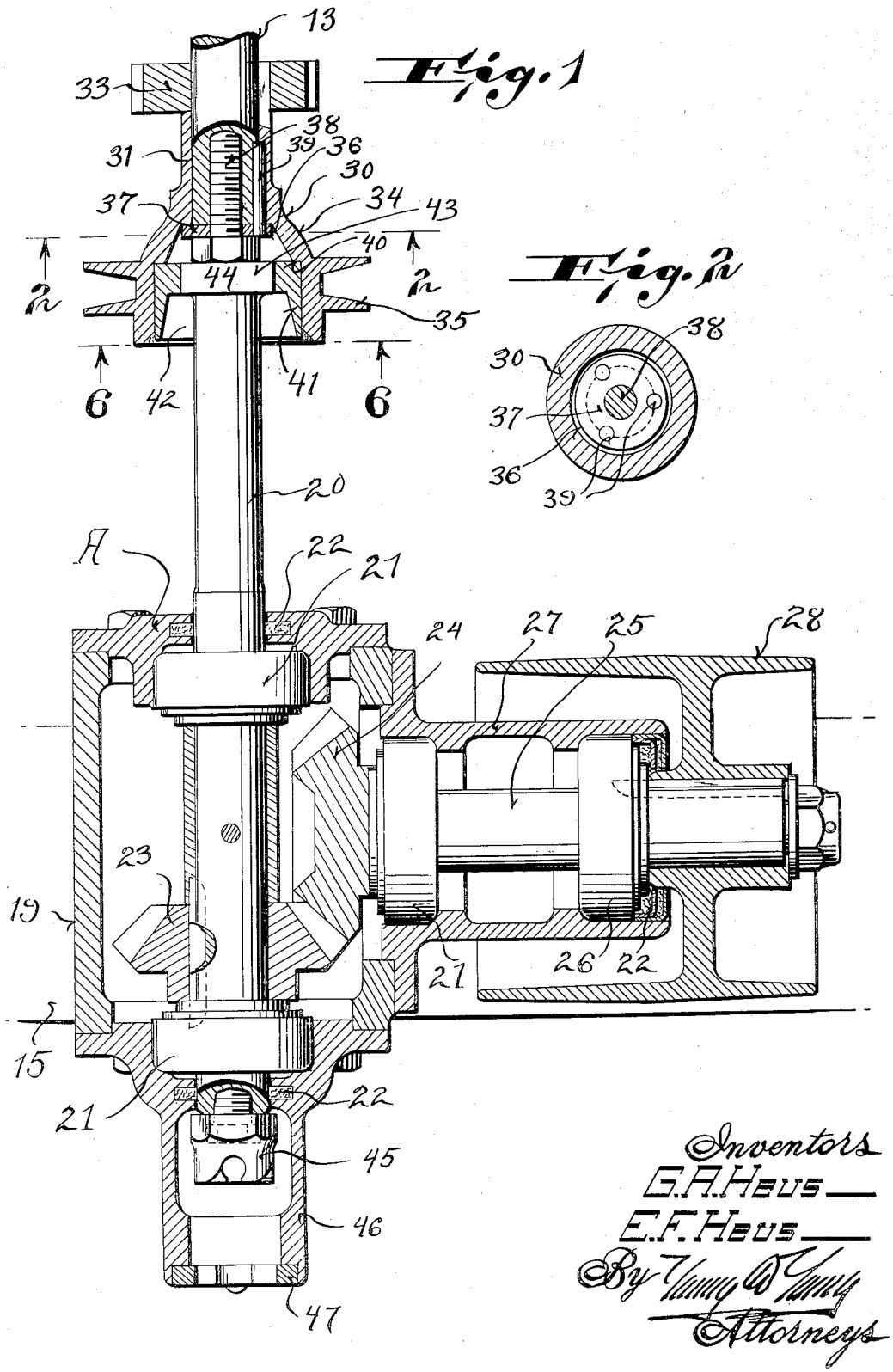

1,958,086

UNITED STATES PATENT OFFICE 1,958,086

POWER TAKE-OFF FOR MOTOR VEHICLES

Germain A. Heus and Ernest F. Heus, Marytown, Wis.

Application March 16, 1932, Serial No. 599,148

4 Claims. (Cl. 180—53)

This invention appertains to attachments for automobiles and has for one of its primary objects the provision of means whereby extraneous machinery can be driven from the power plant of the vehicle.

Another important object of our invention is the provision of a power take-off attachment for automobiles embodying a supporting frame which can be readily secured to the conventional chassis of the automobile in front of the radiator thereof, the attachment embodying novel means for engaging the crank shaft of the vehicle forwardly of the engine, whereby said attachment can be effectively driven from the engine.

Another salient object of our invention is the provision of a power take-off for automobiles including a supporting frame for attachment with the chassis of the vehicle, with a movable gear box supported by the frame, carrying a drive shaft for engagement with the crank shaft of the vehicle, the adjustment of the gear box on the frame forming means whereby the drive shaft can be readily moved into and out of engagement with the crank shaft of the automobile from the front end of the machine.

A further object of our invention is the provision of novel means carried directly by the crank shaft of the vehicle, whereby the drive shaft of the gear box can be moved into and out of driving engagement with the crank shaft, said means being of such a construction, that vibration of the engine incident to the resilient mounting thereof on the chassis frame will not effect the operations of the gear box.

A further important object of our invention is the provision of means for longitudinally adjusting the gear box relative to the vehicle on the supporting frame, so that the drive shaft of the gear box can be moved into and out of engagement with the crank shaft of the vehicle, means being also provided for permitting the transverse and vertical adjustment of the gear box, so that the drive shaft thereof can be conveniently located relative to the crank shaft of the engine.

A still further object of our invention is to provide an improved power take-off for motor vehicles of the above character, which will be durable and efficient in use, one that will be simple and easy to manufacture and one which can be placed upon the market and incorporated with a conventional automobile at an extremely low cost.

With these and other objects in view, the invention consists in the novel construction, arrangement and formation of parts, as will be hereinafter more specifically described, claimed and illustrated in the accompanying drawings, in which:

Figure 1 is a longitudinal sectional view through our improved power take-off unit showing the same operatively connected to the crank shaft of an automobile, the view being taken on the lines 1—1 of Figures 3 and 4, looking in the direction of the arrows;

Figure 2 is a detailed vertical section view taken on the line 2—2 of Figure 1, looking in the direction of the arrows, illustrating the means employed for connecting the novel drive section of the unit with the crank shaft of the engine;

Figure 3 is a fragmentary side elevation of our improved power take-off unit, parts of the view being shown broken away and in section to illustrate structural details;

Figure 4 is a fragmentary front elevation of our improved power take-off unit showing the same mounted on the chassis of a vehicle, only a portion of the chassis being shown and said portion being illustrated in section;

Figure 5 is a top plan view of our invention, showing the means of attaching the unit to the chassis of a motor vehicle and illustrating the drive shaft of the attachment in driving connection with the crank shaft of the engine, and, Figure 6 is a detailed sectional view taken on the line 6—6 of Figure 1, looking in the direction of the arrows, illustrating the novel means carried by the crank shaft for receiving the drive shaft of the unit.

Referring to the drawings in detail, wherein similar reference characters designate corresponding parts throughout the several views, the letter A generally indicates our improved power take-off unit for a motor vehicle B.

The construction of the motor vehicle B forms no part of the present invention, as our novel attachment can be used with any type or make of motor vehicle. Only a sufficient part of the vehicle has been illustrated to show the use of our improved power take-off unit. As shown, the vehicle B includes the side longitudinally extending chassis beams 10, which carry the brackets 11 for a radiator 12 of the cooling system of the engine (not shown) of the vehicle. Extending forwardly toward the radiator 12 is the usual engine crank shaft 13.

Our improved power take-off A comprises a supporting frame 15. This frame 15 may embody a transversely extending channel beam 16 which can be welded or otherwise secured to upstanding end plates 17. These end plates 17 are in turn bolted, as at 18, to the beams 10 of the chassis of the vehicle in front of the radiator 12.

Mounted on the central portion of the channel beam 16 is a gear box 19. This gear box 19 is adjustably mounted on the beam 16 in a novel manner, as will be later set forth. Rotatably mounted within the gear box 19 is the longitudinally extending drive shaft 20 for the power take-off unit, and this shaft extends inwardly beyond the gear box toward the crank shaft 13, for a purpose which will also be hereinafter more fully set forth. We preferably provide ball or roller bearing races 21 for supporting the drive shaft 20 within the gear box, and this gear box can be filled with suitable lubricant, if so desired.

Where the gear box is filled with lubricant, the end walls of the box can be provided with suitable gaskets 22, or the like, around the shaft 20, so as to prevent the leakage of the oil from the box. Keyed or otherwise secured to the drive shaft 20 is a bevelled gear 23 which meshes with a similar bevelled gear 24 keyed or otherwise secured to the driven or power take-off shaft 25. This shaft 25 is supported in suitable ball or roller bearings 26 carried by a sleeve 27 forming a part of the gear box 19. Various walls of the gear box can be made removable, so as to permit ease of assembling and to also permit ready access to be had into the interior of the box for repairs or the like. The outer end of the power take-off or driven shaft 25 extends beyond the supporting sleeve 27 and has keyed or otherwise secured thereto any preferred type of driving element, such as a pulley 28 for permitting the operation of extraneous machinery.

In certain types of automobiles, such as in the Model A Ford, the engines are resiliently mounted on the chassis, so as to reduce vibration between the engine and the chassis. In this type of automobile considerable difficulty is experienced in properly connecting the drive shaft of a power take-off unit with the crank shaft of the engine. One of the salient objects of our invention is the provision of novel means for permitting the effective connecting of a power take-off unit with the crank shaft of a resiliently mounted engine and to facilitate the engagement of the drive shaft with the crank shaft.

Thus, in accordance with our invention, the rotatable ratchet nut carried by the front of the crank shaft, which is provided for the purpose of permitting the hand cranking of the engine, when necessary, is removed and our improved connecting unit 30 is applied to the engine in lieu thereof. Likewise, the ordinary pulley wheel for operating the fan is also removed. The novel unit 30 includes a sleeve 31 which is slipped on the crank shaft 13 in front of the timing gear 33. The sleeve 31 at its forward end is provided with a bell shaped head 34 having formed thereon the pulley wheel 35 for the fan of the vehicle. The inner surface of the head 34 is provided with an inner shoulder 36 against which seats a holding disc 37 connected to the crank shaft by means of a bolt 38. A plurality of pins or keys 39 are inserted in registering ways in the shaft 13 and sleeve 31 for insuring proper driving connection between the crank shaft and sleeve. Forwardly of the inner shoulder 36 is a second shoulder 40. This head receives the case hardened driving nut 41 which is rigidly secured within the head and against the shoulder 40 in any desired manner, such as by welding. The driving nut 41 is ordinarily made separate from the head, so as to facilitate the manufacture of the head and nut and to permit the assembling of these parts on the crank shaft. The structure of the driving nut 41 forms an important part of our invention and the inner face thereof is provided with an inclined guide surface 42 leading toward the polygonal bore 43 of the drive nut.

The extreme inner end of the drive shaft 20 of the power unit, is provided with a polygonal shaped mating drive head 44 which is adapted to be moved into and out of engagement with the polygonal bore of the drive nut 41. The head 44 is also case hardened, so as to prevent wear between the head and the driving nut. The head 44 has a loose fit within the bore of the nut, so that movement of the drive shaft 20 is permitted relative to the crank shaft, and this connection forms a substantially universal joint. The provision of the inclined face 42 leading toward the bore 43 also acts as means for guiding the drive head 44 into the bore incident to the engagement and disengagement of the drive shaft 20 with the crank shaft.

By referring to Figure 1 of the drawings, it will be noticed that the forward end of the drive shaft 20 is provided with a ratchet nut 45, whereby a hand crank can be utilized for manually cranking the engine when necessary. This nut 45 is normally housed within a sleeve extension 46 formed on the gear box 19. A removable front plate 47 can be provided for normally closing the front of the sleeve extension 46, if so desired.

As heretofore intimated, we have provided novel means for mounting the gear box 19 on the cross channel beam 16. This means embodies a vertically disposed supporting rod 50, the upper end of which is threaded into the lower wall of the gear box 19, as at 51. An intermediate portion of the support rod 50 slidably extends through a transverse slot 52 formed in the channel beam 16.

Threaded on the lower end of the rod 50 is an adjusting nut 53 and a coil spring 54 bears against the adjusting nut and against a wear washer 55 engaging the lower face of the channel beam. Obviously, by adjusting the rod 50 within the gear box, the gear box can be raised or lowered relative to the channel beam and to the crank shaft 13.

In order to provide means for sliding the gear box transversely of the channel beam and longitudinally of the vehicle, so as to bring the driving head 44 into and out of engagement with the driving nut or coupling 41, an adjusting rod 56 is disposed between the gear box and the channel beam 16. This rod 56 is threaded into a supporting nut or block 57 welded or otherwise secured to the upper face of the beam 16 adjacent to its front end. The inner end of the adjusting rod 56 carries a bearing head 58, which is seated within a recess 59 formed in the lower face of the block. The outer end of the rod 56 can be provided with a manipulating handle or head 60, so as to facilitate the turning thereof.

Obviously by rotating the rod 56, the same will be fed across the channel beam 16 and consequently move the gear box therewith and the supporting rod 50 in the slot 52. This movement will bring the drive head 44 into or out of the polygonal bore 40 of the coupling nut 41. Stops 61 in the nature of lock nuts can be placed on the rod 56 for limiting the inward movement of the adjusting rod 56.

In order to provide an efficient means for guiding the gear box during its travel, we provide transversely extending guide tracks 62, which are secured to the channel beams 16 in any desired way. The lower face of the gear box adjacent to its opposite sides is provided with depending feet 63 which rests on the guide tracks 62. The inner faces of the guide tracks 62 have bolted or otherwise secured thereto guide plates 64 which extend above the upper face of the tracks 62. The supporting feet 63 can carry inwardly extending adjusting screws 65 for bearing engagement with the plates 64. These screws 65 also provide means for permitting transverse adjustment of the gear box relative to the vehicle within certain limitations.

From the foregoing description, it can be seen that we have provided a novel power take-off unit which can be readily connected or disconnected with the crank shaft of the engine by the adjustment of a single rod, namely, the rod 56. The inclined surface 42 of the coupling nut insures the proper guiding of the drive head 44 into the polygonal bore of the coupling irrespective of any slight variations of the position of the engine. Likewise, the loose play between the drive head and coupling allows free movement of the engine due to vibration without impairing the efficiency of the power take-off unit.

Changes in details may be made without departing from the spirit or the scope of our invention, but what we claim as new is:

We claim:

1. The combination with a motor vehicle including a pair of longitudinally extending chassis beams and a crank shaft, of a power take-off attachment for the vehicle including a supporting frame having a transversely extending cross bar connected with the chassis beams, a gear box disposed above the cross bar, a longitudinally extending drive shaft rotatably mounted in the gear box, a power take-off shaft rotatably carried by the box, means operatively connecting said drive shaft and power take-off shaft together, companion coupling sections carried by the drive shaft and the crank shaft, a feed nut rigidly secured to the cross bar, and an adjusting rod threaded in the feed nut engaging the gear box, whereby upon adjustment of the feed screw the gear box can be shifted toward and away from the crank shaft.

2. The combination with a motor vehicle including a pair of longitudinally extending chassis beams and a crank shaft, of a power take-off attachment for the vehicle including a supporting frame having a transversely extending cross bar connected with the chassis beams, a gear box disposed above the cross bar, a longitudinally extending drive shaft rotatably mounted in the gear box, a power take-off shaft rotatably carried by the box, means operatively connecting said drive shaft and power take-off shaft together, companion coupling sections carried by the drive shaft and the crank shaft, a feed nut rigidly secured to the cross bar, an adjusting rod threaded in the feed nut engaging the gear box, whereby upon adjustment of the feed screw the gear box can be shifted toward and away from the crank shaft, and means for vertically adjusting the gear box on the cross bar.

3. The combination with a motor vehicle including a pair of longitudinally extending chassis beams and a crank shaft, of a power take-off attachment for the vehicle including a supporting frame having a transversely extending cross bar connected with the chassis beams, a gear box disposed above the cross bar, a longitudinally extending drive shaft rotatably mounted in the gear box, a power take-off shaft rotatably carried by the box, means operatively connecting said drive shaft and power take-off shaft together, companion coupling sections carried by the drive shaft and the crank shaft, a feed nut rigidly secured to the cross bar, an adjusting rod threaded in the feed nut engaging the gear box, whereby upon adjustment of the feed screw the gear box can be shifted toward and away from the crank shaft, means for vertically adjusting the gear box on the cross bar, and means for laterally adjusting the gear box on the cross bar.

4. In a power take-off attachment for motor vehicles, a gear box, a drive shaft rotatably mounted in the gear box, a coupling section carried by the drive shaft, and means for adjusting the gear box longitudinally for moving the coupling section into and out of driving engagement with the crank shaft of the motor vehicle.

GERMAIN A. HEUS.
ERNEST F. HEUS.